(12) United States Patent
Weichholdt

(10) Patent No.: US 7,001,269 B2
(45) Date of Patent: Feb. 21, 2006

(54) COMBINE WITH STRAW CHOPPER

(75) Inventor: Dirk Weichholdt, Sarreguemines (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/765,696

(22) Filed: Jan. 27, 2004

(65) Prior Publication Data

US 2004/0242291 A1 Dec. 2, 2004

(30) Foreign Application Priority Data

Jan. 30, 2003 (DE) ................................ 103 03 503

(51) Int. Cl.
*A01F 12/40* (2006.01)
(52) U.S. Cl. ...................................... 460/112; 460/901
(58) Field of Classification Search ................ 460/111, 460/112, 901
See application file for complete search history.

(56) References Cited

U.S. PATENT DOCUMENTS

| | | | |
|---|---|---|---|
| 4,526,180 A | | 7/1985 | Scott et al. |
| 4,552,547 A | | 11/1985 | Carnewal et al. |
| 4,637,406 A | * | 1/1987 | Guinn et al. ................. 460/112 |
| 5,021,028 A | * | 6/1991 | Kersting et al. ............... 460/85 |
| 5,232,405 A | | 8/1993 | Redekop et al. |
| 6,500,064 B1 | * | 12/2002 | Schrattenecker ............ 460/112 |
| 6,554,701 B1 | * | 4/2003 | Wolters ....................... 460/101 |

FOREIGN PATENT DOCUMENTS

| | | |
|---|---|---|
| DE | 36 15 151 | 5/1986 |
| DE | 37 27 156 | 8/1987 |
| DE | 44 31 802 | 9/1994 |
| DE | 100 64 356 | 12/2000 |
| EP | 0 727 135 | 8/1996 |
| EP | 0 958 727 | 11/1999 |
| WO | WO 01/01754 A1 | 1/2001 |

OTHER PUBLICATIONS

Deutz-Fahr, "TopLiner 8xL", 4 pages, notation 91 532 01, printed in Germany 9906.
Case IH, "Cross-Flow", 8 pages, notation CF80 D BR Oct. 1999, printed in Italy.
New Holland, CX Combine, 4 pages, notation printed in Italy Jan. 1909 Satiz Sri (Turin) Cod. N. 12003/BR/D00.

* cited by examiner

*Primary Examiner*—Meredith C. Petravick

(57) ABSTRACT

A combine comprises a separating assembly defining a first crop residue stream and a cleaning assembly having a second crop residue stream. The first crop residue stream is directed to a straw chopper in a chopping mode and around the straw chopper in a straw swath disposition mode. The second crop residue stream is directed to the straw chopper in both modes. A conveying device conveys the second crop residue stream to the straw chopper. The conveying device feeds the second crop stream mechanically and separates it in two partial streams which are fed into the straw chopper. The conveying device has a transversely extending rotational axis parallel to the rotational axis of the straw chopper.

8 Claims, 3 Drawing Sheets

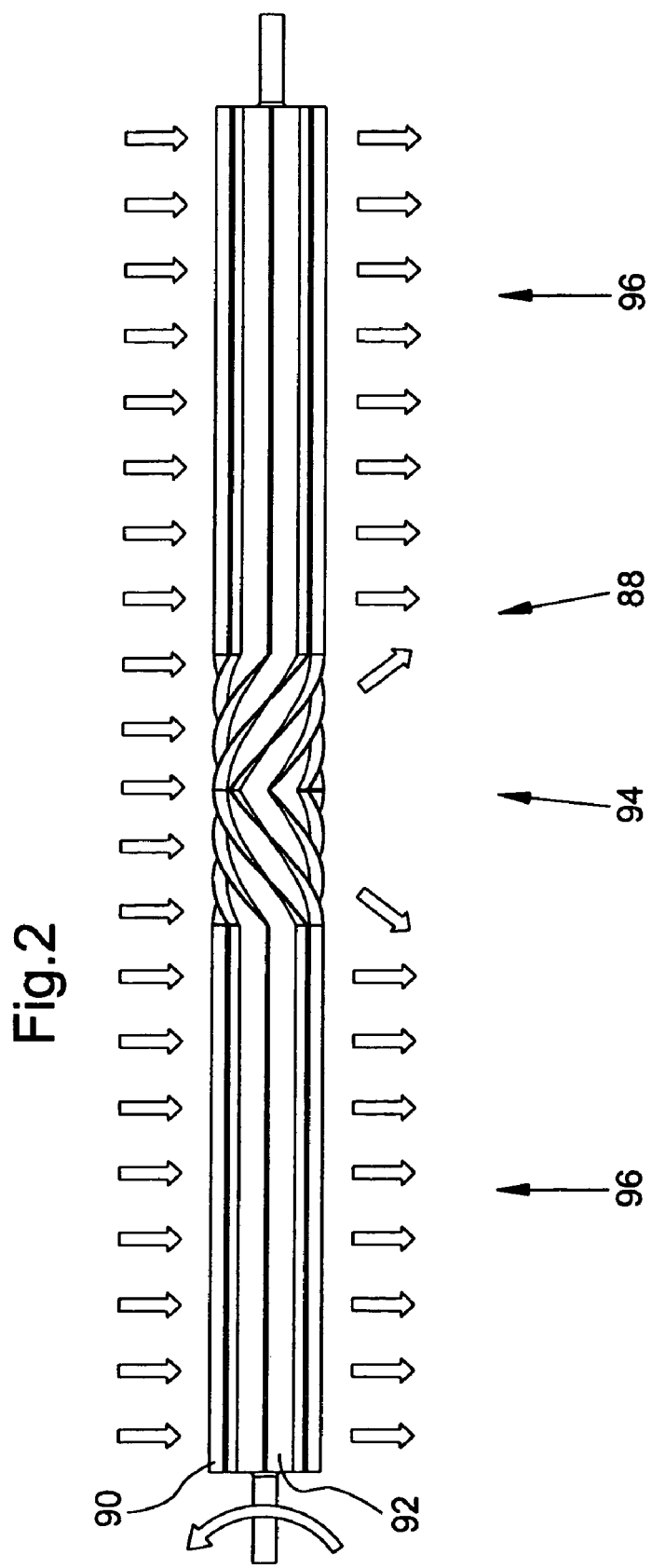

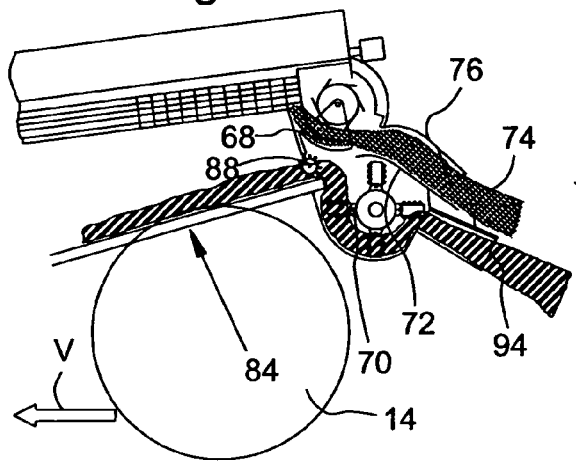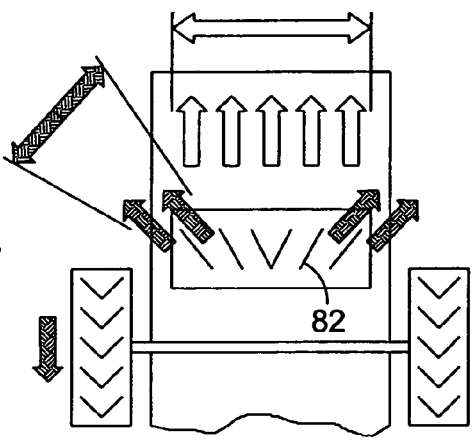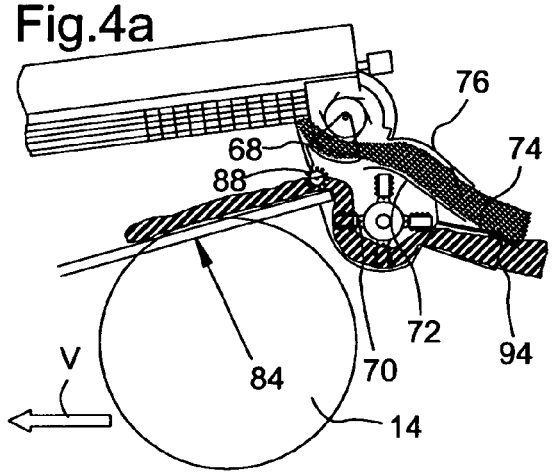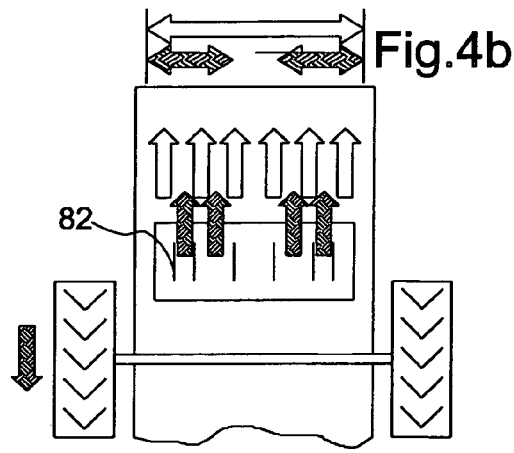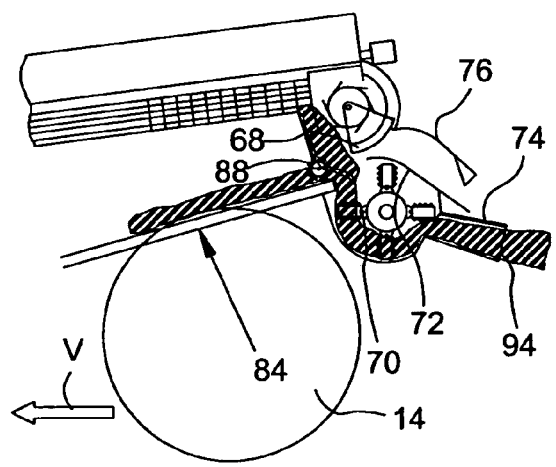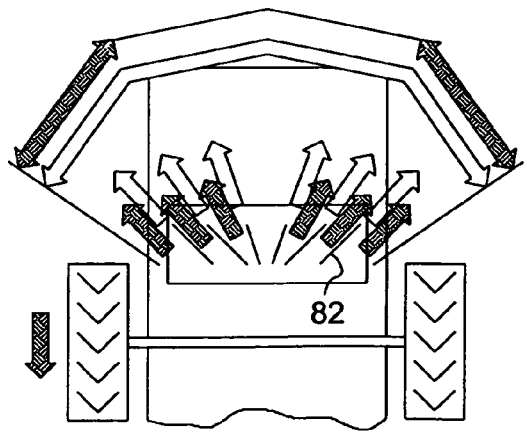

COMBINE WITH STRAW CHOPPER

FIELD OF THE INVENTION

The invention is directed to a combine having two crop residue streams, a first crop residue stream from the separating assembly and a second crop residue stream from the cleaning assembly. Both crop residue streams are directed to a straw chopper. A conveying device conveys the second crop residue stream from the cleaning device to the straw chopper and separates it into two partial streams which are fed into the straw chopper.

BACKGROUND OF THE INVENTION

EP 0 727 135 A discloses a combine, for which in a straw swath mode the straw is deposited on the ground in a swath by straw walkers through a guide plate or in a chopping mode the straw is fed to a straw chopper, in which it is chopped and distributed over the field. The guide plate can be brought into a third position, in which both the straw and also the chaff is guided through the straw chopper. The chaff is fed from the cleaning device into the straw chopper by fans.

WO 01/01754 A discloses a combine with a straw chopper and a chaff distributor. The chaff distributor is arranged such that it can inject the chaff into the straw stream upstream of the straw chopper, so that it continues together with the straw to the straw chopper and is distributed across the field over approximately the operating width of the cutting means.

In DE 100 64 356 A, it is proposed to always guide the chaff through the straw chopper, while the straw is either guided through the straw chopper in the chopping mode or is deflected around to its rear side in the swath deposition mode and deposited in a swath on the ground. In swath deposition mode, the straw guide plate is brought into a position, in which the chaff is distributed on both sides of the swath over the operating width. In long stalked straw deposition mode, the chaff and straw are distributed over the operating width of the field. In the latter, the chaff is to be transported by the fans of the cleaning device and the suction effect of the straw chopper.

Similar arrangements are also known from the brochures "Deutz Fahr Topliner 8XL," notation 91 532 01 Printed in Germany 9906, "Case IH Cross Flow," notation CF80 D BR October 1999, and New Holland CX combine, notation Printed in Italy Jan. 2009 September Satiz SrI (Turin) Cod. N. 12003/BR/D00. There, the straw is either fed through the straw chopper, chopped, and distributed over the operating width, or deflected around to its rear side and deposited on the field in a swath. The chaff is fed into the straw chopper by chaff distributor fans (Deutz Fahr), impeller blower chaff distributors (Case IH) or hydraulically driven radial fans (New Holland). Because the straw chopper also operates in the swath deposition mode, the chaff is distributed over the operating width and the straw can be harvested without chaff portions.

The embodiments proposed by WO 01/01754 A allow a plurality of operating modes through the use of a separate chaff distributor. However, the chaff distributor is relatively costly and complicated. For the embodiments according to EP 0 727 135 A, DE 100 64 356 A, and the mentioned brochures, the chaff distributor can be eliminated, because the straw chopper takes over its task. However, for the embodiment according to DE 100 64 356 A, difficulties in the transport of the chaff are to be expected because it is fed into the straw chopper exclusively by the fans of the cleaning device and the suction effect of the straw chopper. The embodiments proposed in the brochures and in EP 0 727 135 A use fans for feeding the chaff, which usually exhibit rather low efficiency.

In DE 44 31 802 A it is proposed to feed the chaff through a back and forth moving inlet base of a horizontal conveyor screw, which feeds it together with the straw to one or two straw choppers with vertical rotational axes. According to U.S. Pat. No. 5,232,405 A, a conveyor belt is used for feeding the chaff from the cleaning device into a straw chopper with a horizontal rotational axis that is perpendicular to the forward direction. For the two publications mentioned last, no ability is disclosed for depositing the straw in a swath. Thus, the chaff is always distributed over the entire cutting width.

In EP 0 958 727 A it is proposed to feed straw discharged from the cleaning device outwards through a cross auger first perpendicular to the forward direction. There results, on both sides of the combine, two partial streams, which are conveyed backwards by additional conveyor screws and fed in the axial direction to a straw chopper with a horizontal rotational axis perpendicular to the forward direction. However, it is considered to be a disadvantage that the already present speed of the chaff due to the axial feeding to the straw chopper is lost during the output through the screw conveyor, so that the chaff is transported just by the straw chopper. Thus, the range and the width of the chaff is rather small.

According to the published DE 102 56 744 A, the chaff is led from the cleaning device to the inlet of the straw chopper by an oscillating base. In the swath deposition mode, in which the straw is guided around to the rear side of the straw chopper so that it is deposited on the ground unchopped, in order for the chaff to be deposited to the side next to the straw swath, the straw guide plate is adjusted correspondingly, similar to DE 100 64 356 A.

SUMMARY OF THE INVENTION

It is an object of the present invention to provide an improved combine wherein chaff can also be distributed through a straw chopper in two partial crop streams.

A conveyor device is provided, which mechanically guides the second crop residue stream from the cleaning assembly to the straw chopper. The straw chopper is rotated about a horizontal transverse axis. The surface of the conveyor device acts mechanically on the particles of the second crop residue stream. It divides it into two partial streams, which are fed to the straw chopper on both sides of the straw chopper's center plane. In this way, the second crop stream is fed to the straw chopper by the conveyor device in a direction oriented perpendicular to its rotational axis, in particular in a tangential or radial direction.

Because the direction of flow is maintained, an energy intensive deflection of the second crop stream at the inlet of the straw chopper is eliminated. This method produces an operationally safe and energy saving transport of the second crop residue stream into the straw chopper.

The second crop residue stream is conveyed from the cleaning assembly to the conveyor device by an oscillating pan. The surface of the oscillating pan can be smooth, rough, or shaped with steps or saw tooth like projections. However, it would also be possible to use some other type of continuous mechanical conveyor as the conveyor device, such as, e.g., bowl conveyors, paddle conveyors, chain conveyors, belt conveyors, and/or screw conveyors. These conveyor devices are provided with means for dividing the second crop stream, e.g., V or pyramid shaped projections or skids that move with the conveyor or that are mounted on the frame of the combine. These types of conveyors are not pneumatically operated conveyors but are mechanical conveyors.

For the illustrated embodiment, a rotationally driven conveyor drum is provided as the conveyor device. It is provided in its center region with suitable guidance skids, which guide the second crop stream outwards to both sides. Such guidance skids are particularly V shaped.

The illustrated conveyor device works with a lower shaft, which operates especially efficiently. However, an embodiment working with an upper shaft could also be used.

The second crop stream can be fed to the conveyor device from the cleaning device by some other type of conveyor, e.g., a conveyor belt. However, an oscillating pan conveyor is preferred. The conveyor device is preferably arranged at the rear side of the conveyor.

The present invention can be used on a combine, for which the first crop stream (i.e., the straw) is fed to the straw chopper in the chopping mode and is deflected around that stage in the straw swath deposition mode usually to the rear of the straw chopper. The second crop residue stream is fed to the straw chopper in the chopping mode and distributed across the field together with the first crop stream approximately over the width of the harvesting assembly. In the straw swath deposition mode, the second crop stream is likewise fed to the straw chopper in order to provide it with a speed that is sufficient to leave the combine without a problem. The second crop stream can be deposited in the swath in the straw swath deposition mode. It is fed into the straw swath or deposited beneath the swath. Therefore, the chaff can be received and used together with the straw.

For another (particularly optional) mode, the second crop stream is distributed over the field after passing through the straw chopper in the straw swath deposition mode. The conveyor device acts on the straw chopper only at its two sides but not in its center, allows one region of the straw chopper, which would discharge the second crop stream into the swath, not to be loaded with the second crop stream. In this way, one obtains a straw swath, which is free from chaff, so that the straw is received by a baling press or the like without chaff portions and can be fed to further processing.

The deposition of the second and if necessary first crop residue stream can be controlled by several consecutive straw guide plates, which are located downstream of the outlet of the straw chopper. They can have the effect that the crop residues from the straw chopper are deposited in the swath or are distributed approximately over the operating width of the harvesting assembly of the combine. In the straw swath deposition mode, due to the lack of a load in the straw chopper in its center region, even without adjusting the straw guide plates relative to the chopping mode, they can deflect the second crop residue stream far enough outwards that it comes to lie to the side next to the swath.

BRIEF DESCRIPTION OF THE DRAWINGS

FIG. 2 is a top view of the conveyor device, which feeds the chaff into the straw chopper in the combine from FIG. 1.

FIGS. 3a and 3b are schematic side and top views of the combine wherein the straw is deposited in a swath and the chaff is distributed by the straw chopper.

FIGS. 4a and 4b are schematic side and top views of the combine wherein the straw is deposited in a swath and the chaff is fed into the straw swath by the straw chopper.

FIGS. 5a and 5b are schematic side and top views of the combine wherein the straw and the chaff pass through the straw chopper.

DETAILED DESCRIPTION

Figure 1:
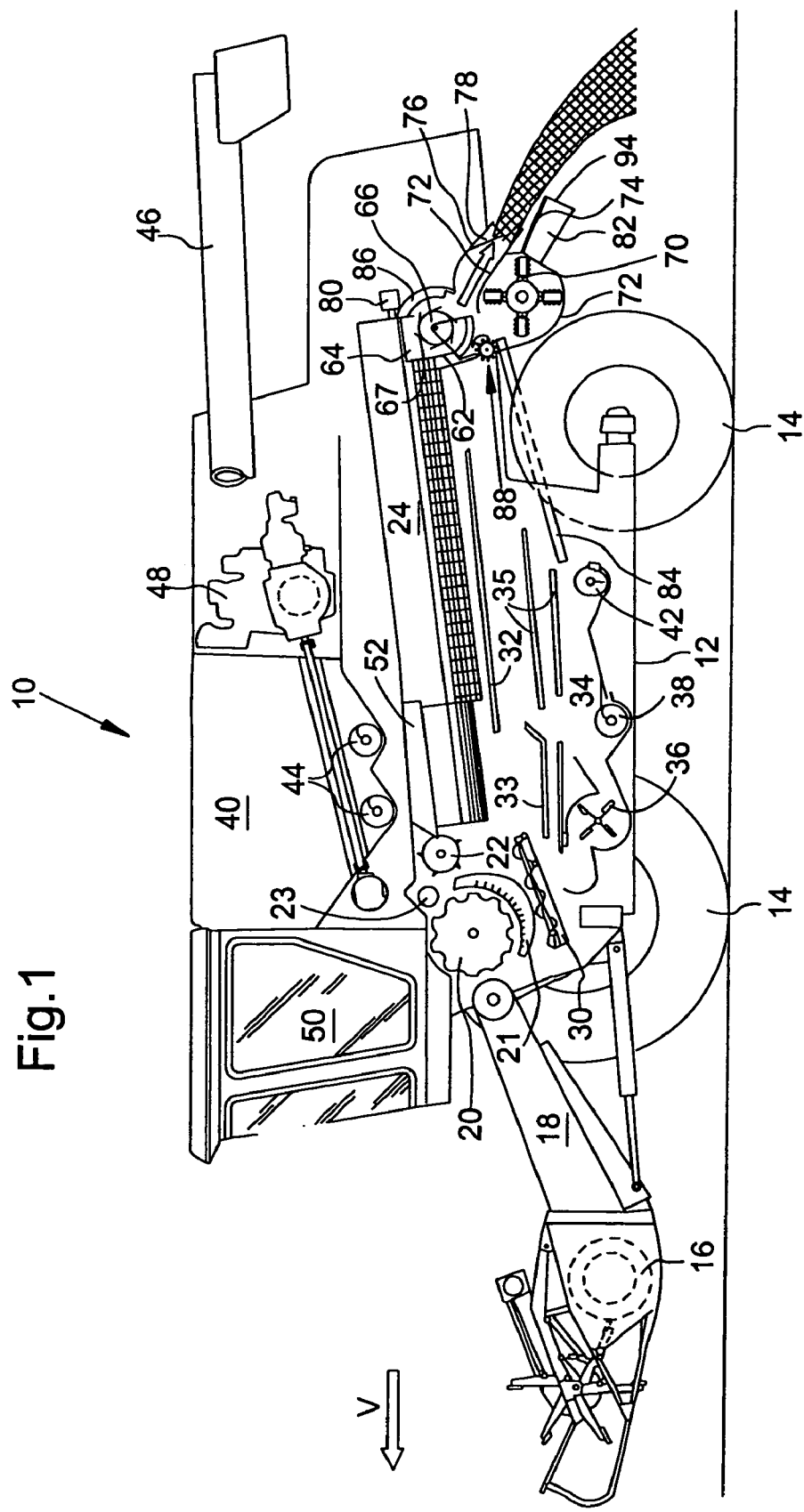
FIG. 1 is a schematic side view of a combine with an axial separator and a straw chopper, which is used to discharge chaff.

FIG. 1 illustrates a self propelled combine 10 having a chassis 12. The chassis 12 is supported by wheels 14. The front wheels being drive wheels and the rear wheels being steering wheels. The front of the combine 10 is provided with a harvesting assembly 16 to harvest crop from the field and to feed it upwards and backwards through a feeder house 18 to threshing and separating assemblies. The threshing assembly comprises a transverse threshing cylinder 20 and concave 21. However, it is also conceivable to leave out the transverse threshing assembly and use an axially arranged rotary threshing and separating assemblies arranged on one or more rotors. Straw walkers or separating drums may be arranged downstream from the threshing assembly as the separating assembly is also conceivable. A stripping roller 23 and a beater 22 feed the threshed crop from the threshing cylinder 20 and the concave 21 to an axial separator 24. The axial separator 24 is driven at its rear by a gear 80. In the following, all of the directional indications, such as forwards, backwards, above, and below, are with reference to the forward direction of travel V of the combine 10.

Grain and chaff, which are separated during the threshing process, fall onto at least auger 30, which feeds both grain and chaff to a preparation pan 33. In contrast, grain and chaff, which are discharged from the axial separator 24, fall onto a shaking grain pan 32, which feeds the grain and chaff to the preparation pan 33 for further processing. The preparation pan 33 directs the grain and the chaff to a cleaning assembly 34 having sieves 35 and a cleaning fan 36. The cleaning fan 36 directs an air blast upwardly through the sieves 35 to separate the chaff from the grain. Cleaned grain is collected on the floor of the combine and fed by a grain auger 38 to an elevator, not shown, which transports the cleaned grain to a grain tank 40. A return auger 42 returns non-threshed crop portions through another elevator, not shown, back into the threshing process. The chaff is thrown out at the rear side of the cleaning device 34 onto an oscillating pan 84. The cleaned grain can be discharged from the grain tank 40 by a discharge system comprising cross augers 44 and a discharge auger 46.

The above-mentioned systems are driven by means of an internal combustion engine 48, which is controlled by an operator from a driver cabin 50. The various devices for threshing, conveying, cleaning, and separating are located within the chassis 12.

From the axial separator 24 a first crop residue stream comprising threshed out crop residue (straw), is thrown out downwards through an outlet 64 at the bottom rear end of the axial separator 24, which is closed at the back. Through the effect of centrifugal force and gravity, the crop residues fall into a vertical discharge shaft, which is closed at the front by a front wall 62. Beneath the outlet 64 there is a discharge beater 66 having crop engaging carriers 67 distributed about its circumference. At the back the discharge beater 66 is closed by a rear wall 86. The discharge beater 66 is rotated about its longitudinal axis, which extends transverse to the forward direction, by a drive in the counterclockwise direction. At approximately half the height of the front wall 62, a straw guide element 68 that can pivot as a whole about the rotational axis of the discharge beater 66 contacts the wall, somewhat beneath the rotational axis of the discharge beater 66. The straw element 68 can be pivoted about this axis between the straw swath deposition position shown in FIGS. 1, 3*a*, and 4*a* and the chopping position shown in FIG. 5*a*.

Beneath and slightly behind the discharge drum 66 in a housing 72 there is a known straw chopper 70, which can be set in rotation by a drive about a horizontal axis that runs transverse to the forward direction (in the counterclockwise direction in the figures). It includes a cylindrical body with swinging, suspended chopping blades, which interact with stationary counter blades arranged in the housing 72 in order to chop the crop residues and distribute them across the field over approximately the cutting width of the harvesting assembly 16 by means of a straw distributor hood 74 equipped with straw guide plates 82. One part of the housing 72 extends above the straw chopper 70 from the front end of the straw distributor hood 74 like an arc approximately up to a point above the rotational axis of the straw chopper 70, as shown in FIGS. 1, 3*a*, 4*a*, and 5*a*.

The straw guidance element 68 has a concave curve (shaped like an arc) and encloses the discharge beater 66 by an angle range of approximately 45° concentrically. It is attached so that it can pivot at its outer ends on the chassis 12 of the combine 10. The straw guidance element 68 extends in the straw swath deposition position shown in FIGS. 1, 3*a*, and 4*a* from the front wall 62 up to almost beyond the rotational axis of the straw chopper 70. In this position, the straw guidance element 68 has the effect that the threshed and separated crop residues, i.e., the first crop stream, are discharged by the discharge beater 66 beneath a discharge hood 76 diagonally backwards and downwards. The discharge hood 76, like the straw distributor hood 74, is provided on its bottom side with straw guidance plates 78 in order to define the width of the swath, in which the crop residues are deposited.

The oscillating pan 84 extends from the rear, lower end of the cleaning device 34 diagonally backwards and up to a chopper inlet, which is configured as an opening that extends over the width of the discharge shaft and the straw chopper 70 between the lower end of the front wall 62 of the discharge shaft and the top end of the housing 72 of the straw chopper 70. The oscillating pan 84 oscillates back and forth motion along its longitudinal direction by a suitable drive, e.g., a cam, similar to the shaker base 32. Because the oscillating pan 84 is provided at its top surface with saw tooth shaped steps or another suitable surface structure, cleaned crop residues from the cleaning device 34 are directed to the rear and upwardly and form the second crop residue stream.

Above the rear, top end of the oscillating pan 84 there is a conveyor device 88 in the form of a conveyor drum. The conveyor device 88 works with a lower shaft and is preferably in drive connection with the straw chopper 70, e.g., through a drive belt. It is driven at a relatively high rpm in order to transport the second crop stream at a high speed into the housing 72 and to feed the straw chopper 70 approximately in the tangential direction. The straw chopper 70 transports the crop stream without deflection and throws it against the straw guide plates 82.

The conveyor device 88 is shown in more detail in FIG. 2. It is built from a conveyor drum 92, around whose perimeter guidance skids 90 projecting in the radial direction are distributed. The conveyor device 88 has a center section 94, in which the guidance skids 90 have a V shape in the top view. In contrast, in the two side sections 96, the guidance skids 90 extend parallel to the longitudinal axis of the conveyor drum 92. The guidance skids 90 have the effect that the second crop stream in the side sections 96 is led backwards and down to the straw chopper 70 without being deflected to the side. In contrast, in the center section 96, the second crop stream is led outwards through the V shaped sections of the guidance skids 90 to both sides.

The side distribution of the second crop stream is indicated in FIG. 2 by the arrows. Before reaching the conveyor device 88, the second crop stream is distributed homogeneously over its width. The V shaped sections of the guidance skids 90 of the conveyor drum 92 guide the second crop stream outwards in the region of the center section 96, so that two separate partial streams of the second crop stream are produced downstream of the conveyor device 88.

As illustrated in FIGS. 1, 3*a* and 4*a* the straw chopper 70 exerts a transporting effect cleaned crop residues (chaff and the short stalked straw portions), which is sufficient to guide them along the straw guide plates 82 and to push them onto the field behind the combine 10.

The straw guide plates 82 of the straw distributor hood 74 are hinged to the straw distributor hood 74 so that they can pivot about axes 94 extending perpendicular to their longitudinal axes and the direction of crop flow. The pivoting axes are located in the illustrated embodiment approximately at the rear end of the straw guide plates. The straw guide plates 82 can be adjusted by hand or from the driver cabin 50 by suitable, remote controlled actuators in the form of electronic or hydraulic motors, particularly with a controller using suitable sensors, which automatically guarantee the realization of the desired chaff width. In this way, the straw guide plates 82 are moved between the wide deposition position shown in FIGS. 3*b* and 5*b* and the swath deposition position shown in FIG. 4*b*.

In the wide deposition position (FIGS. 3*b* and 5*b*), the rear ends of the straw guide plates 82 point outwards. However, the center straw guide plates 82 do not contact each other at their front ends. Nevertheless, the chaff is distributed on both sides of the straw deposited in a swath in the long stalked straw deposition mode and approximately over the width of the cutting means 16. Because the guidance device 88 has separated the second crop stream into two partial streams, the center straw guide plates 82 are not loaded with the second crop stream, so that the latter is also not led into the straw swath. As can be seen with reference to the arrows in FIG. 3*b*, the straw can be harvested without chaff portions.

In the swath deposition position (FIG. 4), the straw guide plates 82 extend in the forward direction of travel V of the combine 10. The chaff is blown into the straw swath in a swath, whose width corresponds approximately to the width of the straw swath, so that a straw/chaff mixture is deposited in the swath, as can be seen with reference to FIGS. 4*a* and 4*b*. By pivoting the straw distributor hood 74 downwards by hand or by a motor about the horizontal axis running perpendicular to the forward direction of travel V at its hinge point on housing 72 of the straw chopper 70, the chaff could also be deposited beneath the straw swath.

It would also be conceivable in the straw swath deposition mode to bring the straw guide plates 82 into a position, in which the chaff is distributed over the field, wherein a part of the chaff also comes to lie under the straw swath because the straw guide plates 82 are brought into a position that lies between the positions shown in FIGS. 3*b* and 4*b*.

In the chopping position, the straw guide element 68 is pivoted about the rotational axis of the discharge beater 66 (in the counterclockwise direction), as shown in FIG. 5*a*. Thus, between the front wall 62 and the front edge of the straw guide element 68, an opening is opened, through which the crop residues are led into the straw chopper 70. In this position, the straw guide element 68 lengthens the rear wall 86 downwards and forwards. The front wall 62 of the straw guide element 68 may be provided with guidance skids in order to be able to load the straw chopper 70 as uniformly as possible. In the straw chopper 70, the straw and the chaff are chopped together and discharged diagonally backwards and down. The straw and chaff are distributed across the field over the operating width of the harvesting assembly 16, as shown in FIG. 5*b* with reference to the arrows. The position of the straw guide plates in FIG. 5*b* is identical with that in FIG. 3*b*. The second crop stream is deposited in the chopping mode to the side of the field regions, which are loaded with a straw swath.

The straw guide element 68 can be moved by hand or by a suitable remote controlled mechanism, preferably from the driver cabin 50, between the straw swath deposition and the chopping positions. Here, buttons or menus can be provided, which allow simultaneous settings of the straw guide element 68 and the straw guide plates 82, so that each of the operating positions of the straw guide element 68 and the straw guide plates 82 shown in FIGS. 3, 4, and 5 can be selected by pressing only one button or activating the selection of only one mode on a monitor.

It should also be mentioned that the straw chopper 70 can be replaced by an impeller blower, which likewise has a horizontal rotational axis oriented perpendicular to the direction of travel. A chopper for reducing the size of the first crop stream is arranged before this blower. The chopper can be arranged, e.g., at the outlet of the axial separator 24.

Having described the illustrated embodiment, it will become apparent that various modifications can be made without departing from the scope of the invention as defined in the accompanying claims.

What is claimed is:

1. A combine comprising a separating assembly, a cleaning assembly and a straw chopper, the separating assembly having a first crop residue stream that can be fed to the straw chopper, the straw chopper has a horizontal and transverse rotational axis and a center plane perpendicular to the rotational axis defining two sides, the cleaning assembly having a second crop residue stream that can be fed to the straw chopper, and a conveyor device comprising a conveyor drum having guidance skids, the conveyor drum having a center section and the guidance skids point transversely outwards in the center section, mechanically conveys the second crop residue stream from the cleaning assembly to the straw chopper, the conveyor divides the second crop residue stream into two partial streams that can be fed to the straw chopper at the two sides of the center plane of the straw chopper, characterized in that the conveyor device is designed to feed the second crop residue stream to the straw chopper in a direction extending perpendicular to the rotational axis of the straw chopper.

2. The combine as defined by claim 1 wherein the conveyor device loads the straw chopper with the second crop stream in a tangential direction.

3. The combine as defined by claim 1 wherein the conveyor drum has V shaped guidance skids in the center section.

4. The combine as defined by claim 1 wherein the conveyor device is arranged at the downstream end of an oscillating pan, which transports the second crop stream from the cleaning assembly to the conveyor device.

5. The combine as defined by claim 1 wherein the first crop stream can be fed to the straw chopper in a chopping mode and can be deflected around the straw chopper in a straw swath deposition mode, in the straw swath deposition mode the straw chopper forms a swath, and the second crop stream can be fed to the straw chopper in the chopping mode and the straw swath deposition mode.

6. The combine as defined by claim 5 wherein the conveyor device is designed to load the straw chopper with the second crop stream, such that it is deposited in the straw swath deposition mode outside the swath.

7. The combine as defined by claim 6 wherein straw guide plates are located downstream from the straw chopper.

8. The combine as defined by claim 7 wherein the combine comprises a harvesting assembly having a working width, in the straw swath deposition mode the second crop residue stream is deposited outside the swath of the first crop residue stream, while in the chopping mode the first crop residue stream is distributed approximately uniformly over the working width of the harvesting assembly without adjusting the straw guide plates relative to the straw swath deposition mode.

* * * * *